US011375136B2

(12) United States Patent
Ichimaru et al.

(10) Patent No.: US 11,375,136 B2
(45) Date of Patent: Jun. 28, 2022

(54) IMAGING DEVICE FOR HIGH-SPEED READ OUT, METHOD OF DRIVING THE SAME, AND ELECTRONIC INSTRUMENT

(71) Applicant: SONY SEMICONDUCTOR SOLUTIONS CORPORATION, Kanagawa (JP)

(72) Inventors: Norihiro Ichimaru, Kanagawa (JP); Masao Zen, Chiba (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 14 days.

(21) Appl. No.: 16/612,554

(22) PCT Filed: Apr. 27, 2018

(86) PCT No.: PCT/JP2018/017156
§ 371 (c)(1),
(2) Date: Nov. 11, 2019

(87) PCT Pub. No.: WO2018/207666
PCT Pub. Date: Nov. 15, 2018

(65) Prior Publication Data
US 2020/0128168 A1    Apr. 23, 2020

(30) Foreign Application Priority Data
May 11, 2017    (JP) .............................. JP2017-094360

(51) Int. Cl.
*H04N 5/235*    (2006.01)
*H04N 5/355*    (2011.01)
(Continued)

(52) U.S. Cl.
CPC ......... *H04N 5/2357* (2013.01); *H04N 5/2355* (2013.01); *H04N 5/23245* (2013.01);
(Continued)

(58) Field of Classification Search
None
See application file for complete search history.

(56) References Cited

U.S. PATENT DOCUMENTS 9,521,351 B1 *  12/2016  Endsley ............... H04N 5/3532
2006/0170812 A1   8/2006  Kobayashi
(Continued)

FOREIGN PATENT DOCUMENTS

CN      101047786 A     10/2007
JP      2006-217255 A    8/2006
(Continued)

OTHER PUBLICATIONS

International Search Report and Written Opinion of PCT Application No. PCT/JP2018/017156, dated Aug. 7, 2018, 10 pages of English Translation and 09 pages of ISRWO.
(Continued)

*Primary Examiner* — Quan Pham
(74) *Attorney, Agent, or Firm* — Chip Law Group

(57) ABSTRACT

The present technology relates to an imaging device, a method of driving the same, and an electronic instrument capable of improving functions by using high-speed readout in a period shorter than the output cycle of an image. An imaging device includes a pixel array unit in which pixels are arranged in a matrix, and a control unit that controls image readout by the pixel array unit. The control unit causes the pixel array unit to perform image readout twice or more within a cycle of outputting one image to the outside. The present technology can be applied to an imaging device or the like including a memory area, for example.

8 Claims, 17 Drawing Sheets

(51) Int. Cl.
*H04N 5/357* (2011.01)
*H04N 5/378* (2011.01)
*H04N 5/232* (2006.01)

(52) U.S. Cl.
CPC ......... *H04N 5/357* (2013.01); *H04N 5/35572* (2013.01); *H04N 5/378* (2013.01)

(56) References Cited

U.S. PATENT DOCUMENTS

| | | | | |
|---|---|---|---|---|
| 2007/0222882 | A1* | 9/2007 | Kobayashi | H04N 5/361 348/311 |
| 2010/0295962 | A1* | 11/2010 | Terauchi | H04N 5/23219 348/222.1 |
| 2012/0236174 | A1* | 9/2012 | Kinrot | H04N 5/2357 348/241 |
| 2015/0035985 | A1* | 2/2015 | Conneely | B60R 1/00 348/148 |
| 2015/0038847 | A1* | 2/2015 | Tanabe | A61B 8/4444 600/447 |
| 2015/0163429 | A1* | 6/2015 | Dai | H04N 5/3535 348/295 |
| 2016/0037045 | A1* | 2/2016 | Jannard | G06T 5/007 348/226.1 |
| 2016/0125575 | A1 | 5/2016 | Takahashi et al. | |
| 2016/0132745 | A1 | 5/2016 | Falb et al. | |
| 2017/0126952 | A1* | 5/2017 | Aoyama | H04N 5/2357 |

FOREIGN PATENT DOCUMENTS

| | | | |
|---|---|---|---|
| JP | 2006-287743 | A | 10/2006 |
| JP | 2006287743 | A * | 10/2006 |
| JP | 2010-074484 | A | 4/2010 |
| JP | 2011-055278 | A | 3/2011 |
| JP | 2013143654 | A | 7/2013 |
| JP | 2014-138294 | A | 7/2014 |
| JP | 2014138294 | A | 7/2014 |
| WO | 2014/112291 | A1 | 7/2014 |

OTHER PUBLICATIONS

Office Action for CN Patent Application No. 201880040627.6, dated Aug. 3, 2021, 9 pages of Office Action and 8 pages of English Translation.

* cited by examiner

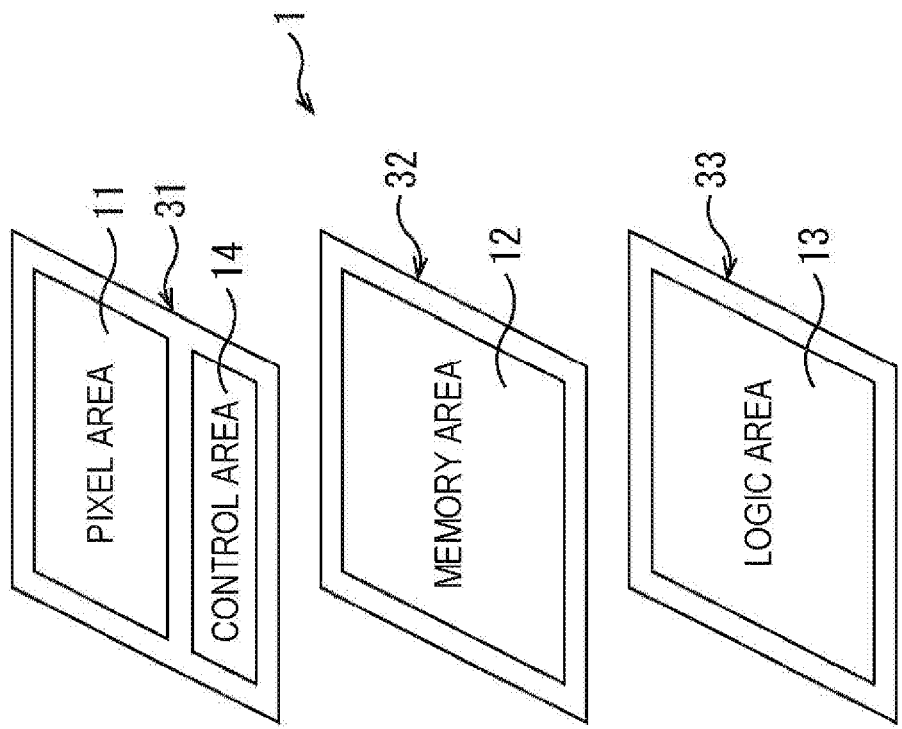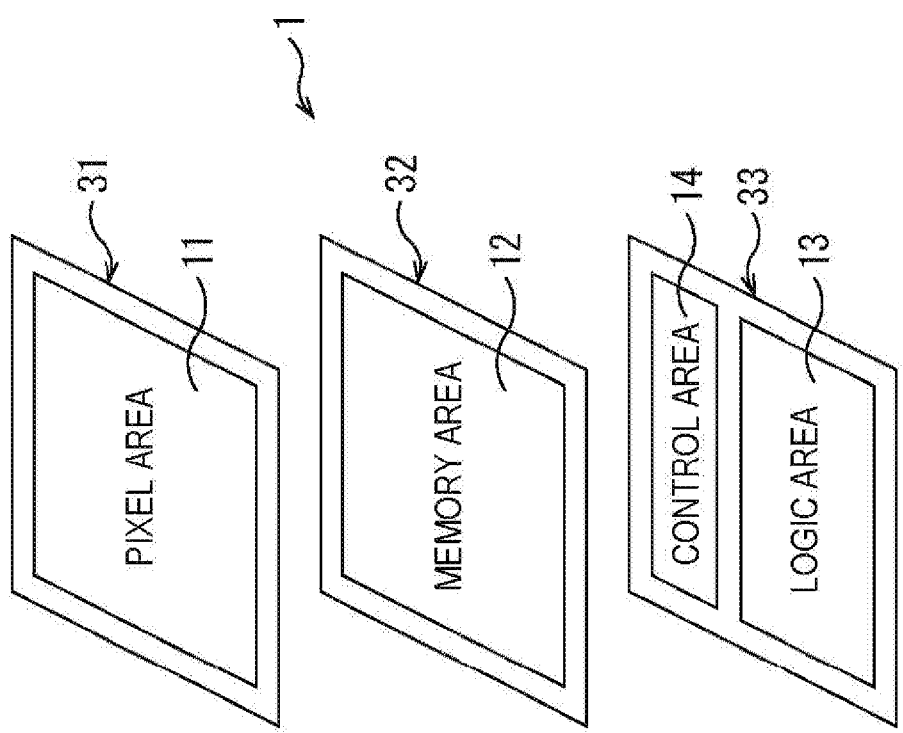

FIG. 3

IMAGE FEATURE DETECTION UNIT

STATISTICAL INFORMATION SUCH AS PEAK VALUE / AVERAGE VALUE OF PIXEL VALUE
MOVEMENT AMOUNT INFORMATION
FLICKER INFORMATION
AREA INFORMATION

FIG. 4

SIGNAL PROCESSING UNIT

- WHITE BALANCE ADJUSTMENT PROCESSING
- GAMMA CORRECTION PROCESSING
- DEMOSAICING PROCESSING
- NOISE REDUCTION PROCESSING (NR PROCESSING)
- DEFECT CORRECTION PROCESSING
- AREA EXTRACTION PROCESSING
- 3D-NR PROCESSING
- HDR IMAGE GENERATION PROCESSING

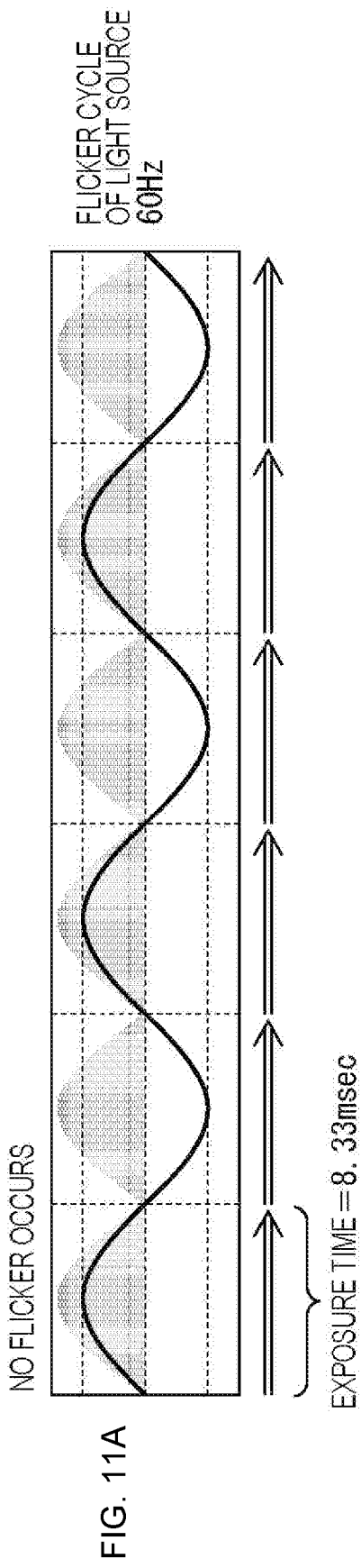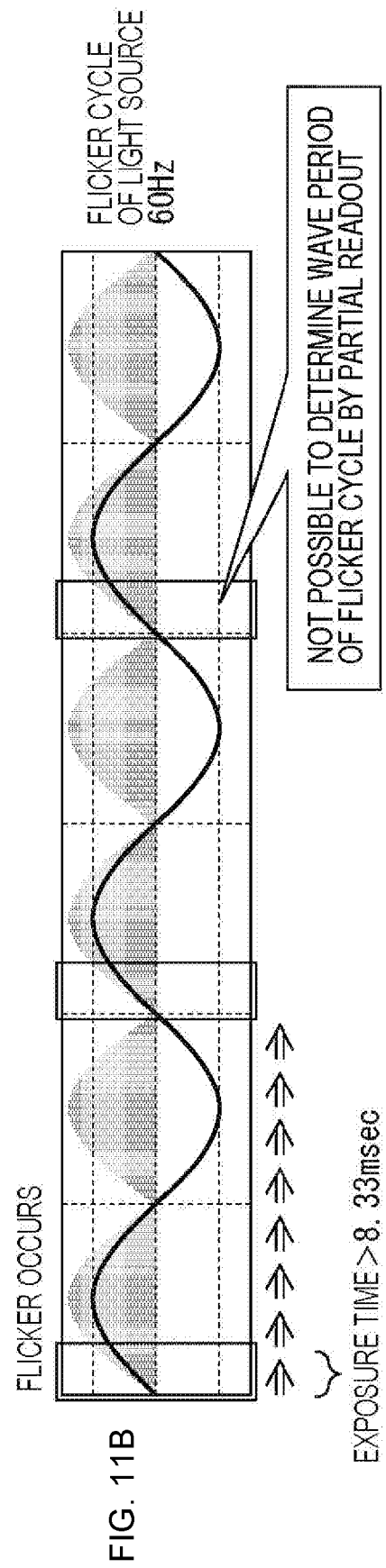

IMAGING DEVICE FOR HIGH-SPEED READ OUT, METHOD OF DRIVING THE SAME, AND ELECTRONIC INSTRUMENT

CROSS REFERENCE TO RELATED APPLICATIONS

This application is a U.S. National Phase of International Patent Application No. PCT/JP2018/017156 filed on Apr. 27, 2018, which claims priority benefit of Japanese Patent Application No. JP 2017-094360 filed in the Japan Patent Office on May 11, 2017. Each of the above-referenced applications is hereby incorporated herein by reference in its entirety.

TECHNICAL FIELD

The present technology relates to an imaging device, a method of driving the same, and an electronic instrument, and particularly to an imaging device, a method of driving the same, and an electronic instrument capable of improving functions by using high-speed readout in a period shorter than the output cycle of an image.

BACKGROUND ART

There is an image pickup device (see Patent Document 1, for example) that performs imaging using an exposure condition for image output, and also performs imaging using an exposure condition for detection whose exposure time is longer or shorter than the exposure condition for image output within one frame period, to appropriately correct the exposure condition for image output.

CITATION LIST

Patent Document

Patent Document 1: Japanese Patent Application Laid-Open No. 2016-6930

SUMMARY OF THE INVENTION

Problems to be Solved by the Invention

Recent imaging devices such as a complementary metal oxide semiconductor (CMOS) sensor are also capable of high-speed readout in a period shorter than the output cycle of an image, and a new function using high-speed readout is desired.

The present technology has been made in view of the foregoing situation, and aims to improve functions by using high-speed readout in a period shorter than the output cycle of an image.

Solutions to Problems

The imaging device of one aspect of the present technology includes a pixel array unit in which pixels are arranged in a matrix, and a control unit that controls image readout by the pixel array unit. The control unit causes the pixel array unit to perform image readout twice or more within a cycle of outputting one image to the outside.

According to a method of driving an imaging device of one aspect of the present technology, an imaging device including a pixel array unit in which pixels are arranged in a matrix and a control unit that controls image readout by the pixel array unit causes the pixel array unit to perform image readout twice or more within a cycle of outputting one image.

An electronic instrument according to one aspect of the present technology includes an imaging device having a pixel array unit in which pixels are arranged in a matrix, and a control unit that controls image readout by the pixel array unit. The control unit causes the pixel array unit to perform image readout twice or more within a cycle of outputting one image to the outside.

In one aspect of the present technology, image readout by the pixel array unit is performed twice or more within a cycle of outputting one image to the outside.

The imaging device may be an independent device, or may be an internal block included in one device.

Effects of the Invention

According to one aspect of the present technology, it is possible to improve functions by using high-speed readout in a period shorter than the output cycle of an image.

Note that the effect described herein is not necessarily limited, and may be any effect described in the present disclosure.

BRIEF DESCRIPTION OF DRAWINGS

FIGS. 2A and 2B is a diagram for describing a three-layer laminated structure of the imaging device.

FIG. 3 is a diagram for describing feature amount detection processing.

FIG. 4 is a diagram for describing signal processing.

FIGS. 11A and 11B is a diagram for describing a specific example of outputting flicker information as feature amount information.

MODE FOR CARRYING OUT THE INVENTION

Figure 1:
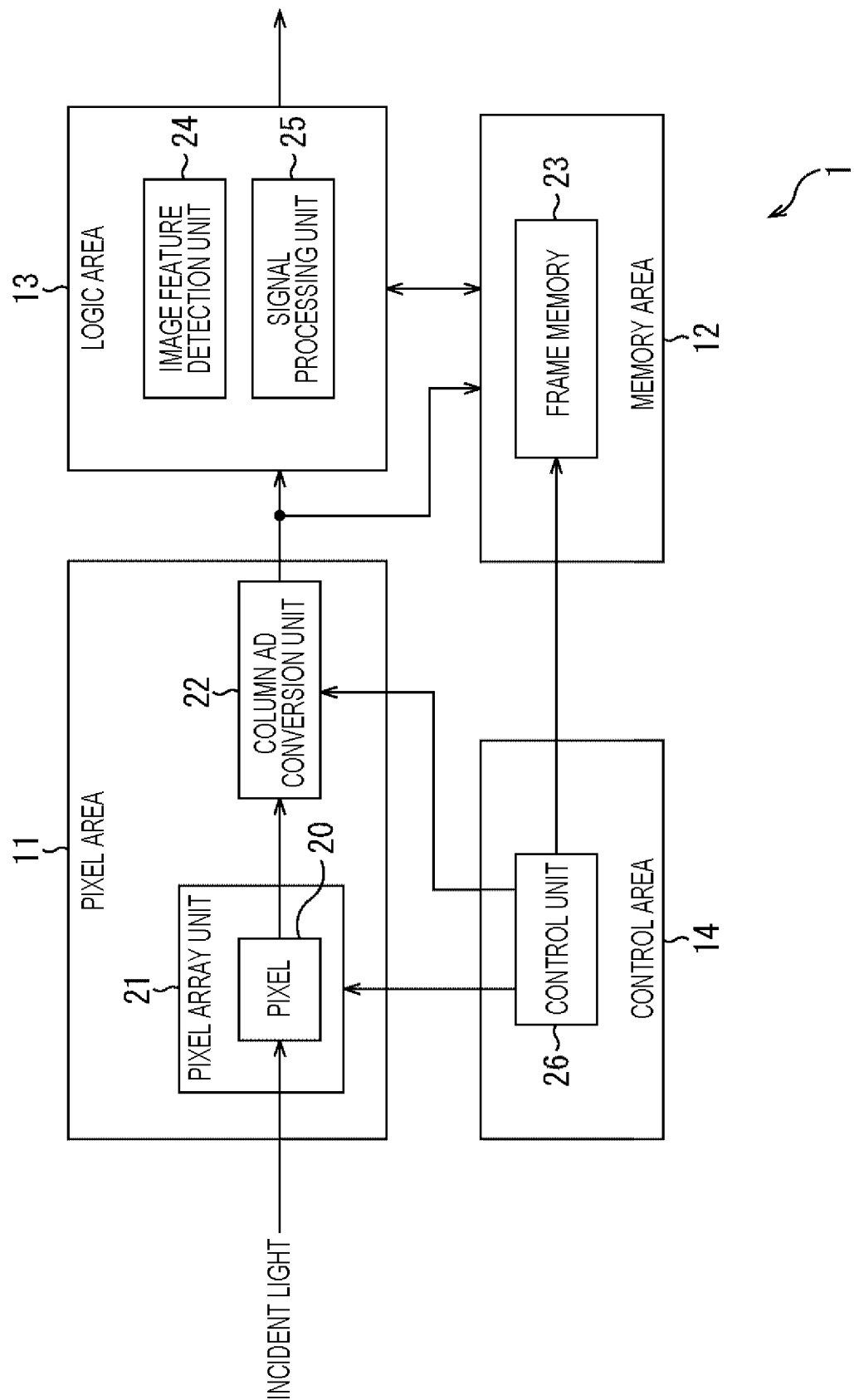
FIG. 1 is a block diagram showing a schematic configuration of an imaging device to which the present technology is applied.

Hereinafter, a mode for carrying out the present technology (hereinafter referred to as embodiment) will be described. Note that the description will be given in the following order.

1. Configuration example of imaging device
2. Description of first operation mode
3. Description of second operation mode
4. Description of operation mode switch processing
5. Example of outputting flicker information as feature amount information in first operation mode
6. Example of outputting HDR image as output image in first operation mode
7. Example of application to electronic instrument
8. Use example of image sensor
9. Example of application to movable body <1. Configuration Example of Imaging Device>

FIG. 1 is a block diagram showing a schematic configuration of an imaging device to which the present technology is applied.

An imaging device 1 of FIG. 1 includes a pixel area 11, a memory area 12, a logic area 13, and a control area 14.

(Substrate Configuration Example)

As shown in FIGS. 2A and 2B, the imaging device 1 can be formed by a three-layer structure in which three semiconductor substrates 31 to 33 are stacked.

More specifically, as shown in FIG. 2A, a configuration can be adopted in which, of the three semiconductor substrates 31 to 33, the pixel area 11 is formed in the first semiconductor substrate 31 on the incident light side, the memory area 12 is formed in the second semiconductor substrate 32 in the middle, and the logic area 13 and the control area 14 are formed in the third semiconductor substrate 33 below the second semiconductor substrate 32.

Alternatively, as shown in FIG. 2B, a configuration can be adopted in which, of the three semiconductor substrates 31 to 33, the pixel area 11 and the control area 14 are formed in the first semiconductor substrate 31, the memory area 12 is formed in the second semiconductor substrate 32, and the logic area 13 is formed in the third semiconductor substrate 33.

The three semiconductor substrates 31 to 33 are electrically connected to one another by through vias or Cu—Cu metallic bonds, for example.

As described above, the imaging device 1 has a three-layer structure in which the three semiconductor substrates 31 to 33 are stacked to form a configuration provided with the memory area 12 that temporarily stores multiple images in addition to the pixel area 11 that generates a pixel signal, the control area 14 that controls the pixel signal, and the logic area 13 that performs predetermined signal processing on an image captured by a pixel array unit 21.

Returning to the description of FIG. 1, the pixel area 11 has the pixel array unit 21 and a column AD conversion unit 22, and the memory area 12 has a frame memory 23. Additionally, the logic area 13 has an image feature detection unit 24 and a signal processing unit 25, and the control area 14 has a control unit 26.

In the pixel array unit 21 of the pixel area 11, pixels 20 having photoelectric conversion units that generate and accumulate photocharges according to the light quantity of incident light are two-dimensionally arranged in a matrix of row direction and column direction. The column AD conversion unit 22 converts an analog pixel signal output from each of the two-dimensionally arranged pixels 20 into a digital pixel signal, and outputs the digital pixel signal to at least one of the memory area 12 or the logic area 13. The pixel array unit 21 and the column AD conversion unit 22 are driven according to a timing signal or the like supplied from the control unit 26.

The frame memory 23 of the memory area 12 is formed of a volatile memory such as a dynamic read only memory (DRAM), for example, and has a storage area for storing two or more images. The memory area 12 temporarily stores an image supplied from the column AD conversion unit 22 in the frame memory 23, and outputs the image to the logic area 13 on the basis of control of the control unit 26.

The image feature detection unit 24 in the logic area 13 detects a predetermined feature amount of an image acquired by the pixel array unit 21. An example of the image feature amount detected by the image feature detection unit 24 will be described later with reference to FIG. 3.

The control unit 26 instructs what kind of image feature amount the image feature detection unit 24 detects. The image feature detection unit 24 acquires one or more images stored in the frame memory 23 as necessary according to an instruction from the control unit 26, and detects feature amounts of the images. Note that in FIG. 1, illustration of control signals from the control unit 26 to the logic area 13 is omitted.

The signal processing unit 25 subjects an image acquired by the pixel array unit 21 to predetermined signal processing, and outputs an image signal of the processed image to the subsequent stage (outside) of the imaging device 1. When outputting the processed image, the signal processing unit 25 adds feature amount information indicating the feature amount detected by the image feature detection unit 24 to the output image, and outputs the result. An example of signal processing that can be performed by the signal processing unit 25 will be described later with reference to FIG. 4. The control unit 26 instructs what kind of signal processing the signal processing unit 25 executes.

The control unit 26 of the control area 14 controls the overall operation of the imaging device 1.

For example, the control unit 26 controls driving of the pixels 20 and the column AD conversion unit 22 by supplying a predetermined clock signal and timing signal to each pixel 20 and the column AD conversion unit 22. Additionally, the control unit 26 controls writing of an image (data) to the frame memory 23 and reading of an image (data) from the frame memory 23 by supplying a predetermined clock signal and timing signal to the memory area 12.

Moreover, the control unit 26 instructs the image feature detection unit 24 to detect a predetermined feature amount of the image, and instructs the signal processing unit 25 the content of predetermined signal processing to be performed on the image.

The imaging device 1 can perform imaging in at least two operation modes including a first operation mode where the pixel array unit 21 is caused to read out an image twice or more within a period in which the logic area 13 outputs one image, and a second operation mode where the pixel array unit 21 is caused to read out an image once within the period. The control unit 26 performs control to switch between the first operation mode and the second operation mode.

According to the imaging device 1 configured as described above, multiple images can be picked up inside the device by high-speed readout within a cycle of outputting one image in the first operation mode. For example, four images can be picked up at 120 fps inside the device within a 30 fps period in which one image is output. A 30 fps period is a time per image at 30 fps (frame per second), and is 1000/30=approximately 33.33 msec.

Thus, by integration, combination, or the like of multiple images obtained inside the device, it is possible to output, as one output image, an image that cannot be formed by one imaging.

Additionally, by detecting feature amounts of the images using the multiple images obtained inside the device and outputting the feature amounts together with the output image as feature amount information, it is possible to output information that cannot be detected from one image obtained by high-speed readout as additional information.

Hence, according to the imaging device 1, an image that cannot be formed by one imaging can be output as one output image, or information that cannot be detected from one image can be output as additional information using multiple images obtained inside the device. As a result, functions of the imaging device 1 can be improved.

FIG. 3 shows an example of feature amount detection processing performed by the image feature detection unit 24.

For example, the image feature detection unit 24 detects statistical information such as a peak value (at least one of maximum value or minimum value) and an average value (APL) of a pixel value of each pixel forming an image as a feature amount of the image.

Additionally, for example, the image feature detection unit 24 detects movement amount information indicating a movement amount of a target subject from the multiple images as a feature amount of the image. For example, in a case where 10, −5, and 20 are detected as motion amounts of predetermined pixels between images adjacent in the time direction from four images, a set of 10, −5, and 20 may be output together with the output image as feature amount information, or 25=10−5+20, which is the final movement amount of predetermined pixels in the four images, may be output together with the output image as feature amount information.

Additionally, the image feature detection unit 24 detects flicker information for correcting a flicker component included in an image as a feature amount of the image, for example. Additionally, for example, the image feature detection unit 24 detects area information indicating an area of a target object in the image as a feature amount of the image. For example, face area information indicating a face area in an image as a target object area, is detected as a feature amount of the image.

FIG. 4 illustrates an example of signal processing performed by the signal processing unit 25.

For example, the signal processing unit 25 performs signal processing such as white balance adjustment processing, gamma correction processing, demosaicing processing, noise reduction processing (NR processing), defect correction processing, and the like on one image picked up by the pixel array unit 21.

Additionally, for example, the signal processing unit 25 performs area extraction processing for extracting a face area, in order to generate an image of only the face area as an output image, on the basis of the face area information detected by the image feature detection unit 24. Note that in the area extraction processing, it is possible to extract not only the face area but also a desired object area.

Additionally, the signal processing unit 25 can also perform predetermined signal processing using multiple images including one image supplied from the pixel area 11 and one or more images stored in the memory area 12, and output the processed image to the subsequent stage (outside) of the imaging device 1.

As the predetermined signal processing using multiple images, the signal processing unit 25 detects the periodicity of noise in the time direction from multiple images continuous in the time direction, and performs 3D-NR processing to reduce noise on the basis of the detected periodicity of noise on each image to be output, for example.

Additionally, as the predetermined signal processing using multiple images, the signal processing unit 25 performs processing to generate an HDR image with an expanded dynamic range from two images with different exposure times, using an image acquired by setting the exposure time to a first time (short exposure time) and an image acquired by setting the exposure time to a second time (long exposure time) longer than the first exposure time, and outputs the obtained HDR image, for example.

The signal processing unit 25 may perform processing other than the above-described signal processing. Additionally, multiple kinds of processing may be performed on a predetermined image.

In the first operation mode, the output image output from the signal processing unit 25 may be a predetermined one image out of multiple images picked up by high-speed readout, a processed image obtained by subjecting the above predetermined one image to signal processing, or an image newly generated using multiple images picked up by high-speed readout.

<2. Description of First Operation Mode>

Figure 5:
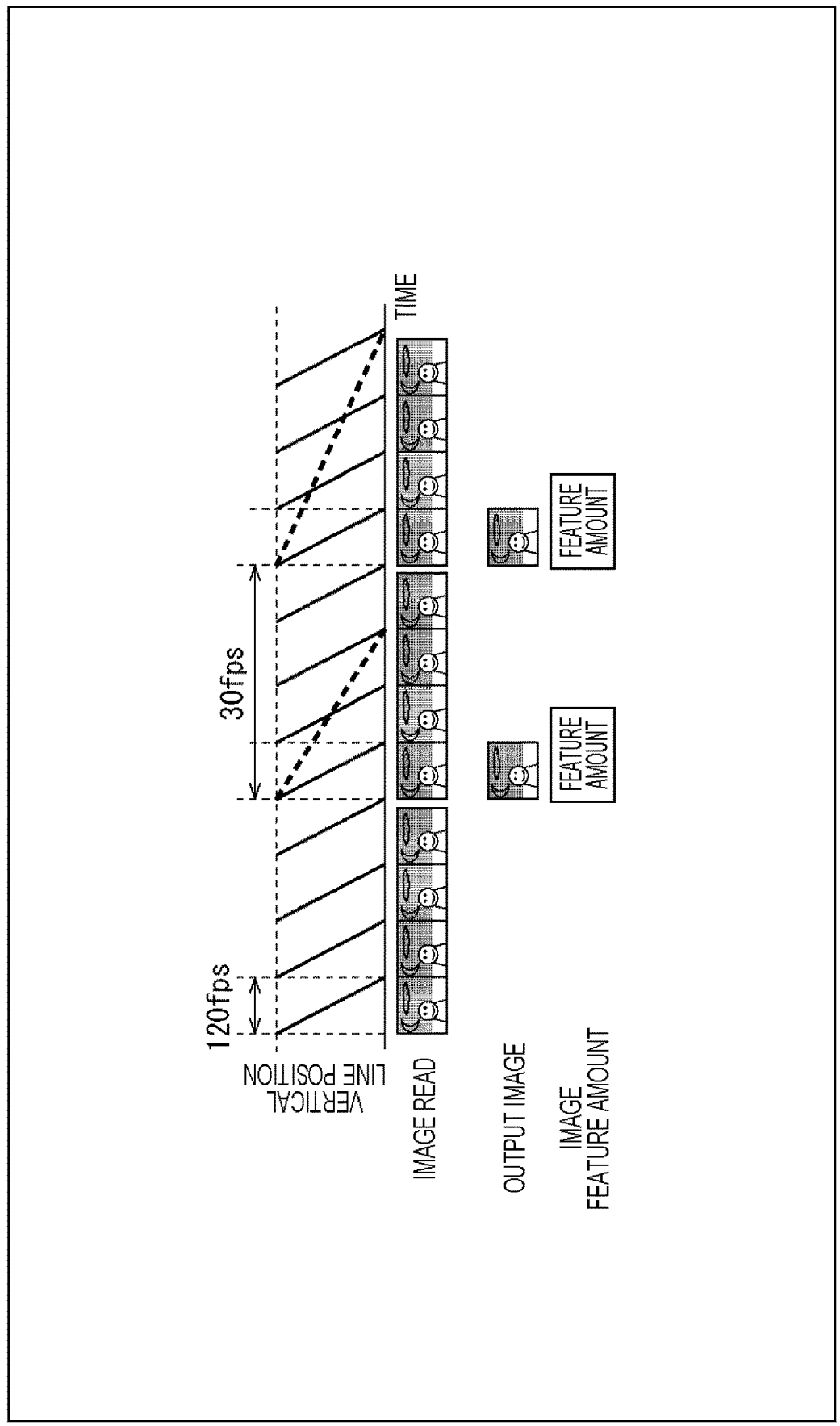
FIG. 5 is a diagram for describing a first operation mode.

FIG. 5 is a diagram for describing the first operation mode.

In the time chart shown on the upper side of FIG. 5, the horizontal axis represents time, and the vertical axis represents the vertical line position of the pixel array unit 21.

Additionally, in the time chart, a thick solid line indicates readout of a pixel signal from the pixel array unit 21 to the column AD conversion unit 22, and a thick dashed line indicates output of an image from the logic area 13 to the subsequent stage (outside) of the imaging device 1.

In the time chart, the thick solid line and the thick dashed line are drawn as oblique lines because the readout of pixel signals in the pixel array unit 21 and the output of the image to the subsequent stage of the imaging device 1 are sequentially performed row by row.

In the example of the first operation mode shown in FIG. 5, the imaging device 1 performs the image readout by the pixel array unit 21 four times at 120 fps, and outputs an image to the subsequent stage at 30 fps. Accordingly, the pixel array unit 21 reads out four images within a 30 fps period which is a cycle of outputting one image.

The signal processing unit 25 performs predetermined signal processing using four images acquired in a 30 fps period to generate an output image.

The image feature detection unit 24 performs predetermined feature amount detection processing using four images acquired in a 30 fps period. The feature amount detected by the image feature detection unit 24 is added to the output image after signal processing by the signal processing unit 25 as feature amount information, and is output to the outside of the imaging device 1.

Figure 6:
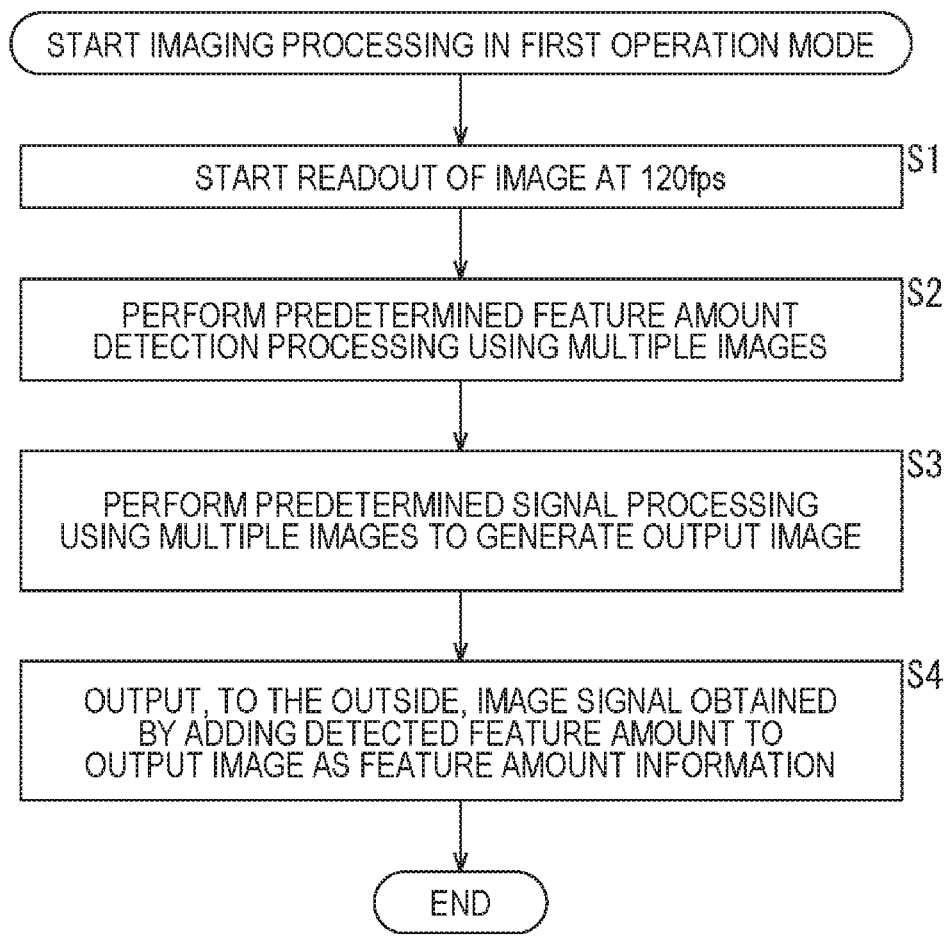
FIG. 6 is a flowchart for describing imaging processing in the first operation mode.

The imaging processing of the imaging device 1 in the first operation mode will be described with reference to the flowchart of FIG. 6. The processing is started when an instruction for imaging in the first operation mode is supplied from the outside of the imaging device 1, for example.

First, in step S1, the control unit 26 causes the pixel array unit 21 to read out an image at 120 fps. The pixel array unit 21 starts reading out an image at 120 fps. For example, in the pixel array unit 21, after resetting signals accumulated in the photoelectric conversion unit including a photodiode or the like, exposure (light reception) is started, and readout to the column AD conversion unit 22 is performed after the elapse of a predetermined period. By performing the above-described series of operations on the pixels 20 arranged two-dimensionally in a matrix row by row in a sequential manner, one image is acquired. In the first operation mode, the pixel array unit 21 performs imaging four times in a 30 fps period.

In step S2, the image feature detection unit 24 performs predetermined feature amount detection processing using multiple (four) images acquired in the 30 fps period.

In step S3, the signal processing unit 25 performs predetermined signal processing using the multiple (four) images acquired in the 30 fps period to generate an output image.

In step S4, the signal processing unit 25 outputs, to the outside of the imaging device 1, an image signal obtained by adding the feature amount detected by the image feature detection unit 24 to the output image as feature amount information.

In the first operation mode, the processing of steps S1 to S4 described above is performed repeatedly.

Note that in a case where the signal processing performed by the signal processing unit 25 is processing for selecting a desired one image from among four images acquired in a 30 fps period, a predetermined one of the four images is taken as an output image. Accordingly, the output image is not necessarily a new image generated using four images.

<3. Description of Second Operation Mode>

Figure 7:
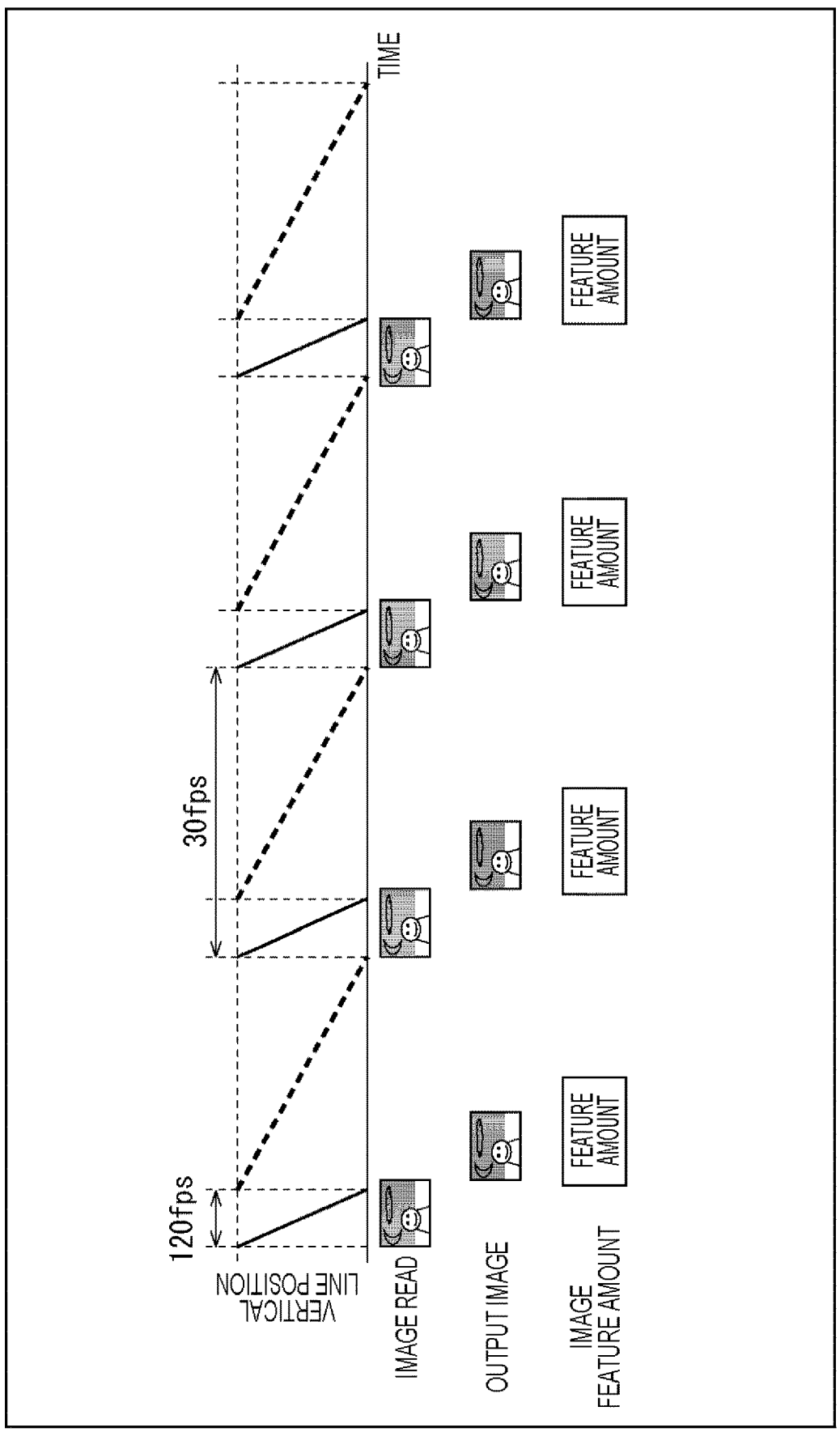
FIG. 7 is a diagram for describing a second operation mode.

FIG. 7 is a diagram for describing the second operation mode.

In the example of the second operation mode shown in FIG. 7, the imaging device 1 performs the image readout by the pixel array unit 21 once at 120 fps, and outputs the image to the subsequent stage at 30 fps. Hence, the pixel array unit 21 outputs one image read at high speed at 120 fps to the outside at a low speed of 30 fps.

The signal processing unit 25 performs predetermined signal processing using one image acquired within the 30 fps period to generate an output image.

The image feature detection unit 24 performs predetermined feature amount detection processing using one image acquired within the 30 fps period. The feature amount detected by the image feature detection unit 24 is added to the output image after signal processing by the signal processing unit 25 as feature amount information, and is output to the outside of the imaging device 1.

Figure 8:
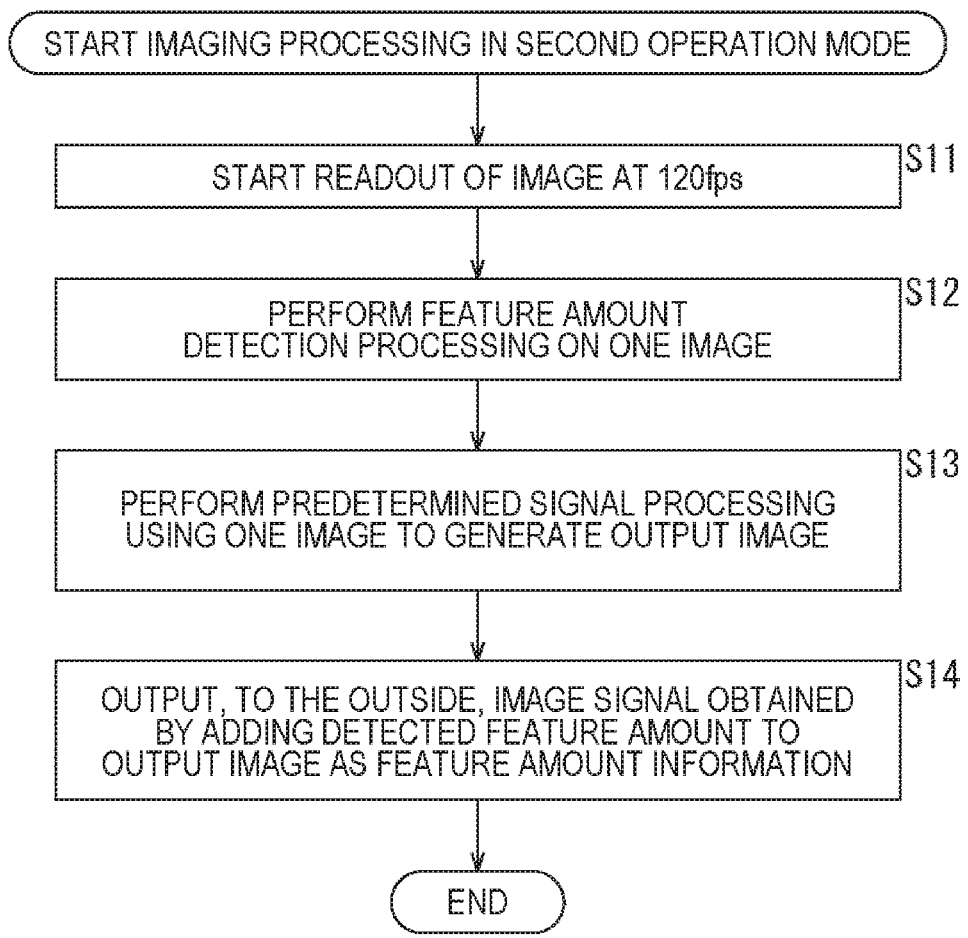
FIG. 8 is a flowchart for describing imaging processing in the second operation mode.

The imaging processing of the imaging device 1 in the second operation mode will be described with reference to the flowchart of FIG. 8. The processing is started when an instruction for imaging in the second operation mode is supplied from the outside of the imaging device 1, for example.

First, in step S11, the control unit 26 causes the pixel array unit 21 to read out an image at 120 fps. The pixel array unit 21 starts reading out an image at 120 fps. In the second operation mode, the pixel array unit 21 performs imaging once within a 30 fps period.

In step S12, the image feature detection unit 24 performs predetermined feature amount detection processing on one image acquired by the pixel array unit 21. The feature amount detection processing in the second operation mode may be the same as or different from the feature amount detection processing in the first operation mode.

In step S13, the signal processing unit 25 performs predetermined signal processing using one image acquired by the pixel array unit 21, and generates an output image.

In step S14, the signal processing unit 25 outputs, to the outside of the imaging device 1, an image signal obtained by adding the feature amount detected by the image feature detection unit 24 to the output image as feature amount information.

In the second operation mode, the processing of steps S11 to S14 described above is performed repeatedly.

<4. Description of Operation Mode Switch Processing>

Figure 9:
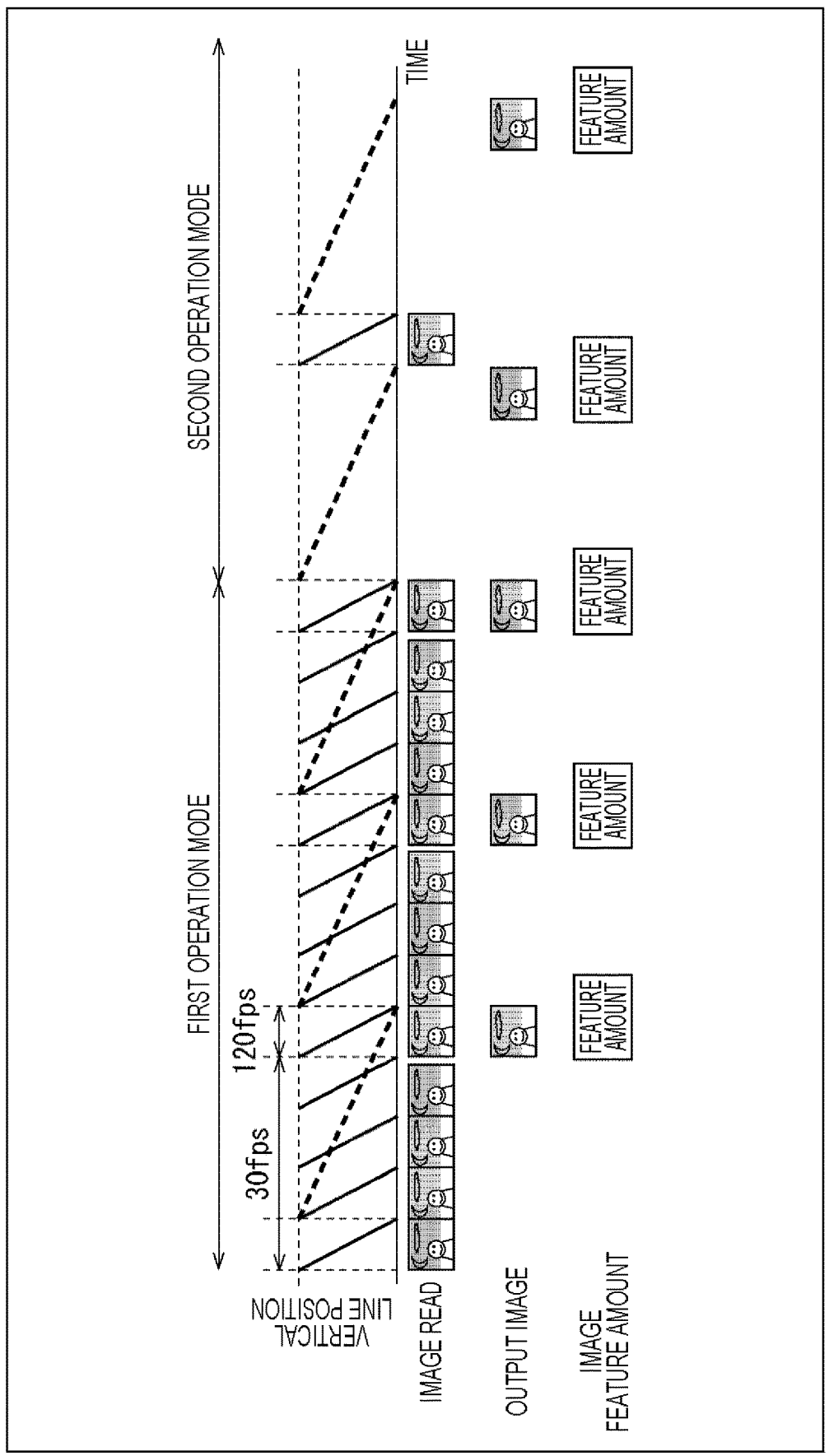
FIG. 9 is a diagram for describing a switching operation for switching the operation mode.

FIG. 9 is a diagram for describing a switching operation of switching the operation mode from the first operation mode to the second operation mode.

The control unit 26 performs control to switch between the first operation mode and the second operation mode at a predetermined timing.

For example, in the first mode in which image readout is performed four times at 120 fps and one image is output at 30 fps, power consumption increases. For this reason, if it is detected that power consumption has increased to a first threshold or more, the control unit 26 performs control to change the operation mode from the first operation mode to the second operation mode, for example. Additionally, if power consumption falls to a second threshold or less, the control unit 26 performs control to change the operation mode from the second operation mode to the first operation mode.

Figure 10:
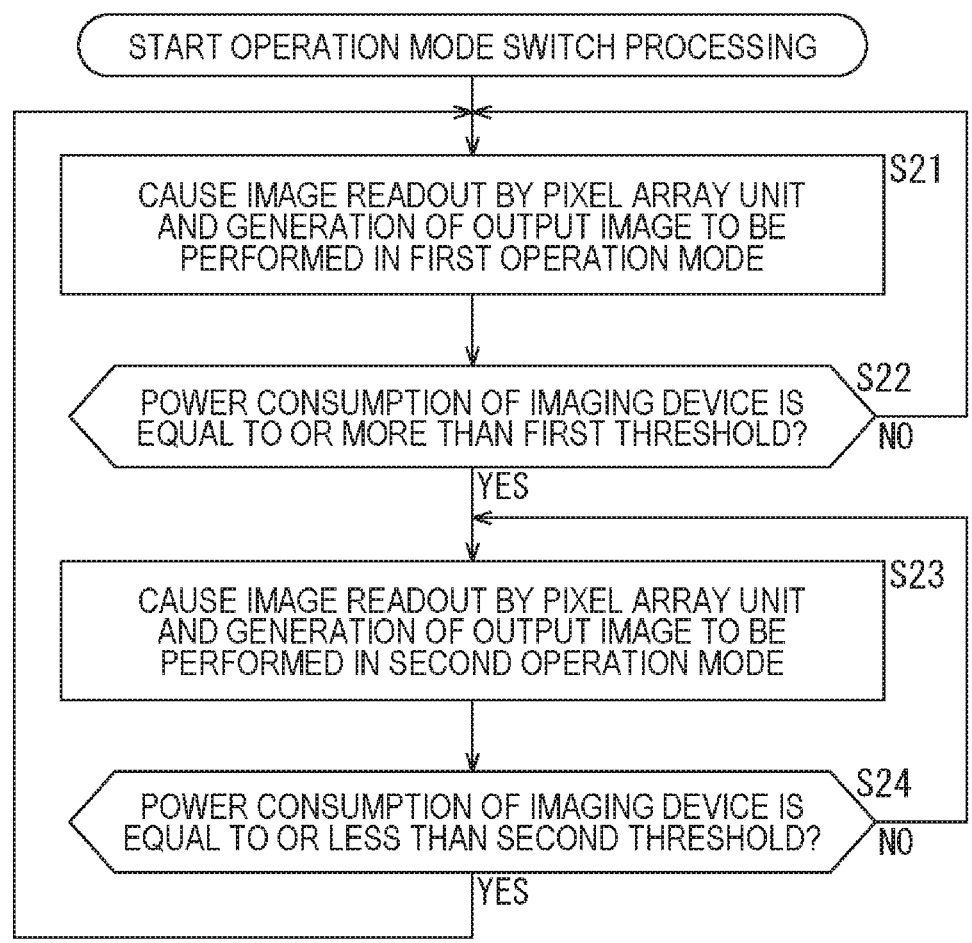
FIG. 10 is a flow chart for describing operation mode switch processing.

The operation mode switch processing for switching the operation mode will be described with reference to the flowchart of FIG. 10.

First, in step S21, the control unit 26 causes image readout by the pixel array unit 21 and generation of the output image to be performed in the first operation mode. In the first operation mode, as has been described with reference to the flowchart of FIG. 6, four image readouts at 120 fps and generation of one output image are performed in a 30 fps period.

In step S22, the control unit 26 determines whether power consumption of the imaging device 1 is equal to or more than the first threshold, on the basis of power consumption information indicating power consumption of the imaging device 1 detected by a power sensor. The power sensor may be inside or outside the imaging device 1.

In step S22, the processing of step S21 is repeated until it is determined that power consumption of the imaging device 1 is equal to or more than the first threshold. Thus, while power consumption of the imaging device 1 is lower than the first threshold, the imaging processing in the first operation mode is continuously performed.

Then, if it is determined in step S22 that power consumption of the imaging device 1 is equal to or more than the first threshold, the processing proceeds to step S23, and the control unit 26 causes image readout by the pixel array unit 21 and generation of the output image to be performed in the second operation mode. In the second operation mode, as has been described with reference to the flowchart of FIG. 8, one image readout at 120 fps and generation of one output image are performed in a 30 fps period.

In step S24, the control unit 26 determines whether power consumption of the imaging device 1 is equal to or less than the second threshold on the basis of power consumption information indicating power consumption of the imaging device 1 detected by the power sensor.

In step S24, the processing of step S23 is repeated until it is determined that power consumption of the imaging device 1 is equal to or less than the second threshold. Thus, while the power consumption of the imaging device 1 is larger than the second threshold, the imaging processing in the second operation mode is continuously performed.

Then, if it is determined in step S24 that power consumption of the imaging device 1 is equal to or less than the second threshold, the processing returns to step S21, and the processing of step S21 described above is performed. That is, the operation mode is changed from the second operation mode to the first operation mode, and imaging processing in the first operation mode is started.

As described above, the imaging device 1 can adaptively switch between the first operation mode and the second operation mode in consideration of power consumption of the imaging device 1.

Note that instead of acquiring power consumption information from the power sensor, temperature information may be acquired from a thermo sensor, and the first operation mode and the second operation mode may be adaptively switched on the basis of whether the acquired temperature information is equal to or lower, and equal to or higher than respective predetermined thresholds, for example.

Alternatively, the operation mode can be changed on the basis of an operation instruction from the outside of the imaging device 1.

<5. Example of Outputting Flicker Information as Feature Amount Information in First Operation Mode>

Next, a specific example of outputting flicker information as feature amount information in the first operation mode will be described with reference to FIGS. 11A, 11B, and 12.

In the rolling shutter scheme in which exposure of each pixel and readout of pixel signals are sequentially performed in the vertical direction in row units, it is desirable to set the exposure time short in order to reduce focal plane distortion.

However, when the exposure time is set shorter than the light source cycle of a fluorescent lamp or the like, flicker occurs.

Generally, when imaging is performed under the illumination of a fluorescent lamp, streaky luminance unevenness and color unevenness occur in the image. In particular, it is confirmed that the fringe patterns of high and low luminance portions flow on the screen. Such a phenomenon is flicker, and the cause of this phenomenon is the repeated blinking of a fluorescent lamp connected to an AC power supply at a cycle twice the power supply frequency, and the operation principle of the imaging device.

To prevent occurrence of flicker, the exposure time is only required to be set to be a multiplication cycle of the flicker cycle to perform imaging. For example, as shown in FIG. 11A, in a case where the light source cycle is 60 Hz, the shortest exposure time that can be flickerless is 1000/(60*2)=8.33 msec.

On the other hand, as shown in FIG. 11B, in a case where the exposure time is set to a time shorter than 8.33 msec to perform imaging, an image with flicker is generated.

Additionally, in the case of performing imaging with the exposure time shorter than 8.33 msec, it is not possible to determine which wave period of the flicker cycle of the light source the exposure period is, and therefore it is not possible to correct luminance unevenness due to flicker.

Hence, in the first operation mode, to reduce focal plane distortion, the imaging device 1 outputs an image in which the exposure time is set shorter than the flicker cycle of the light source as an output image, and outputs flicker information as feature amount information, for example. Flicker information is correction information for correcting luminance unevenness due to flicker included in an output image in an image signal processor (ISP) at the subsequent stage of the imaging device 1.

Specifically, the imaging device 1 causes the pixel array unit 21 to perform image readout twice or more within a cycle in which the signal processing unit 25 outputs one image (hereinafter also referred to as image output cycle). In a period of readout of multiple images performed within a cycle of outputting one image, a half cycle of the flicker cycle, or more preferably, one cycle of the flicker cycle is included.

Figure 12:
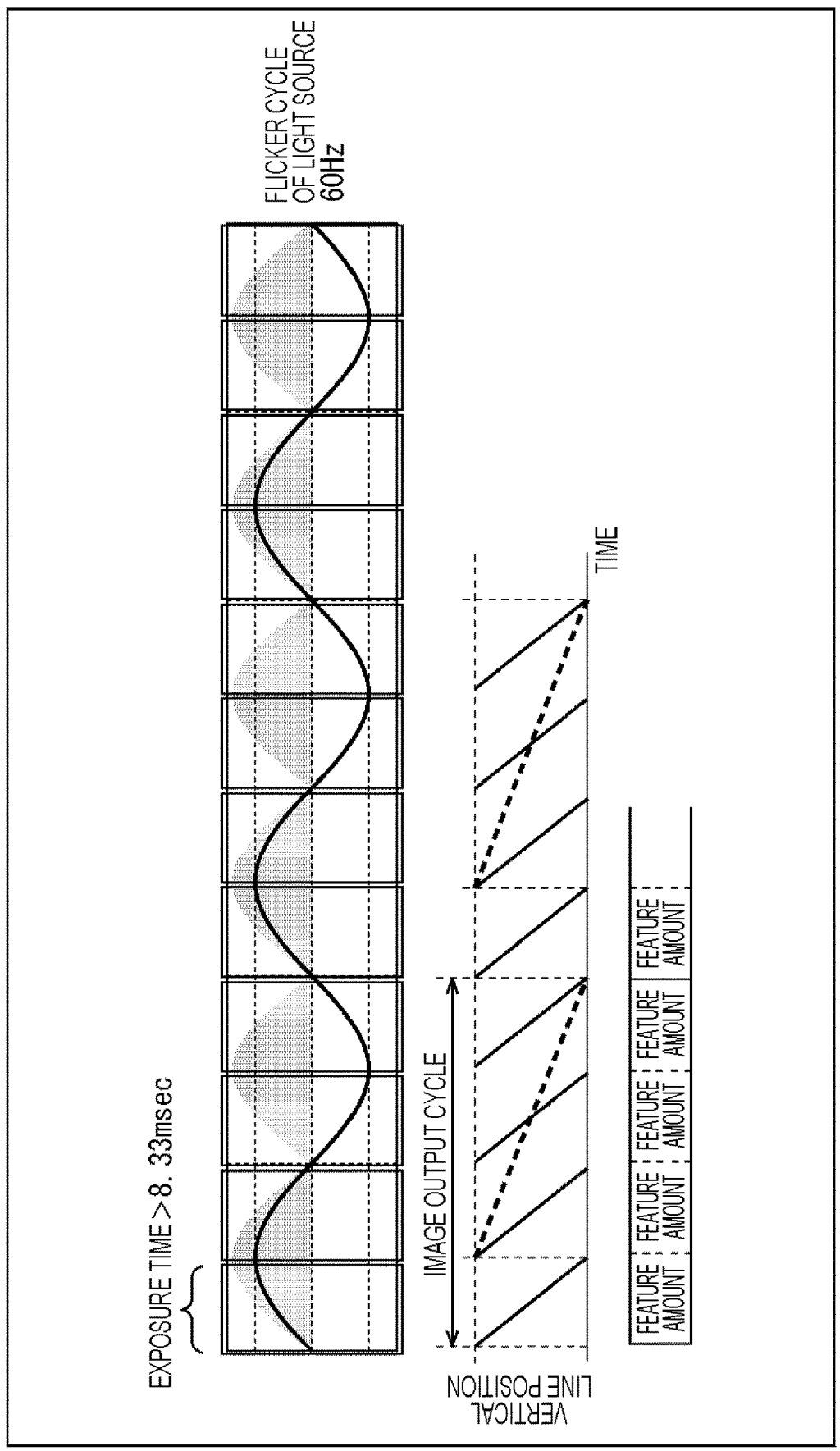
FIG. 12 is a diagram for describing a specific example of outputting flicker information as feature amount information.

In the example of FIG. 12, the pixel array unit 21 performs four image readouts within the image output cycle, two image readout periods are ½ cycle of the flicker cycle, and four image readout periods are one cycle of the flicker cycle.

The image feature detection unit 24 generates histogram information of luminance (pixel value) as flicker information for each of the four images obtained within the image output cycle. The signal processing unit 25 outputs an output signal obtained by adding flicker information on each of the four images detected by the image feature detection unit 24 to the output image as feature amount information to the outside of the imaging device 1. As a result, the ISP at the subsequent stage of the imaging device 1 can detect the flicker cycle to correct the flicker phenomenon of the output image, or adjust the exposure time of imaging performed next by the imaging device 1 to the multiplication cycle of the flicker cycle. As the output image, a predetermined one of four images is output, for example.

As described above, by using the result of picking up multiple images by high-speed readout inside the device in a cycle of outputting one image (e.g., 30 fps period), the imaging device 1 can add and output, as additional information, information that cannot be obtained from one output image picked up by high-speed readout. As a result, in the image processor (e.g., ISP) which processes the output image, a high quality image can be obtained using the additional information.

<6. Example of Outputting HDR Image as Output Image in First Operation Mode>

Figure 13:
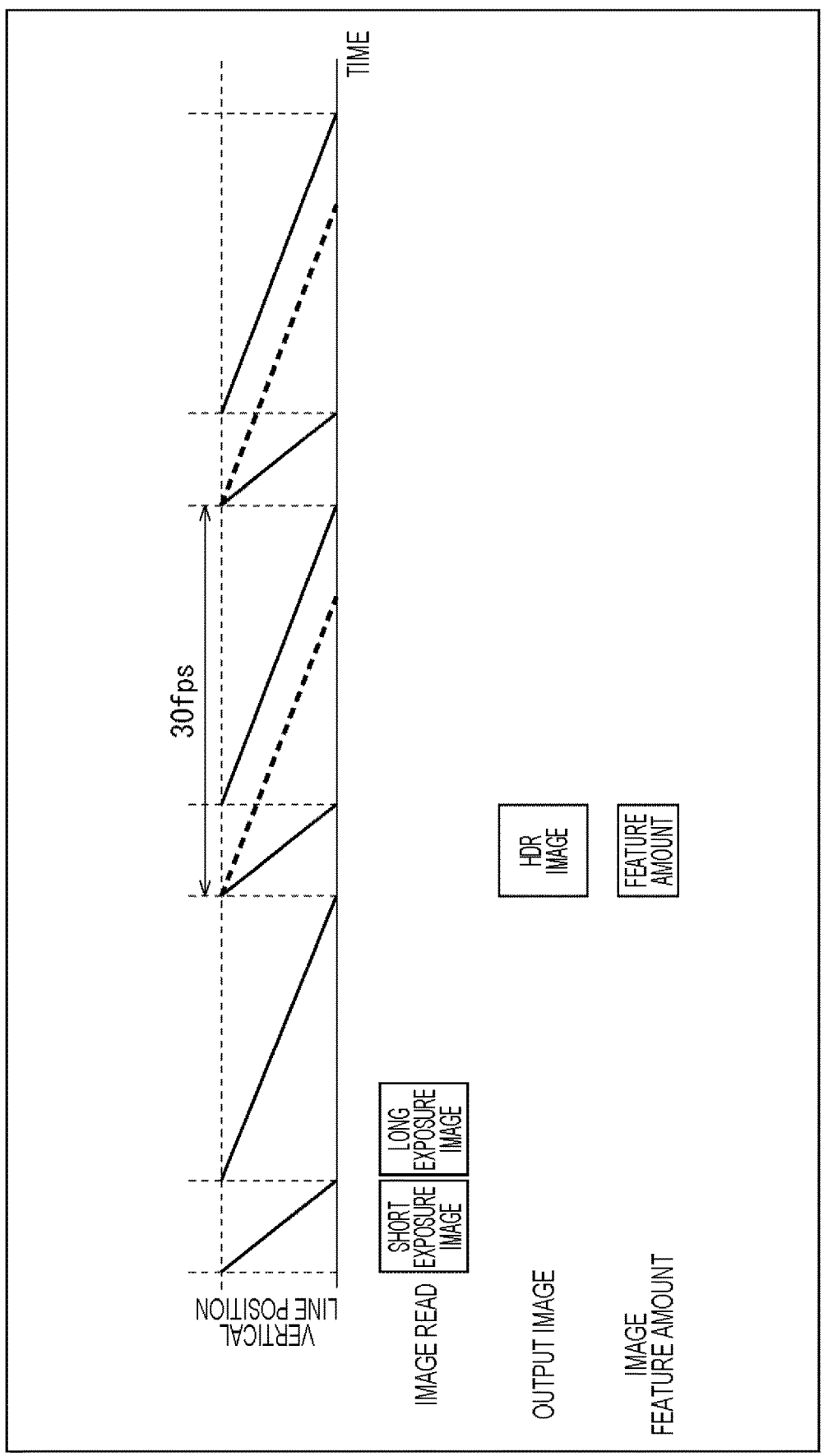
FIG. 13 is a diagram for describing a specific example of outputting an HDR image as an output image.

Next, a specific example of outputting an HDR image as an output image in the first operation mode will be described with reference to FIG. 13.

The control unit 26 causes the pixel array unit 21 to perform image readout twice within the image output cycle. The first image read out is a short exposure image set to have a short exposure time (first exposure time), and the second image read out is a long exposure image set to have a second exposure time longer than the first exposure time.

The signal processing unit 25 generates an HDR image in which the dynamic range is expanded from two images (short exposure image and long exposure image) having different exposure times.

The image feature detection unit 24 detects statistical information on respective pixel values of the short exposure image and the long exposure image, specifically, a peak value or an average value of the pixel values as a feature amount of the image.

The signal processing unit 25 outputs an image signal obtained by adding, as feature amount information, the detected feature amount of the image to the HDR image as an output image, to the outside of the imaging device 1.

Note that the imaging device 1 can also pick up three or more images by varying the exposure time of the images within an image output cycle, and generate an HDR image in which the three or more images are combined.

As described above, by using the result of picking up multiple images by high-speed readout inside the device in a cycle of outputting one image (e.g., 30 fps period), the imaging device 1 can generate a predetermined composite image using multiple images and output the composite image as an output image. As a result, the load of processing performed by the image processor (ISP) that processes the output image signal can be reduced.

<7. Example of Application to Electronic Instrument>

The present technology is not limited to application to an imaging device. That is, the present technology is applicable to electronic instruments in general that use an imaging device as an image capturing unit (photoelectric conversion unit) such as an image pickup device like a digital still camera and a video camera, a portable terminal device having an imaging function, and a copying machine using an imaging device as an image reading unit. The imaging device may be formed as a single chip, or may be in a modular form having an imaging function in which an imaging unit and a signal processing unit or an optical system are packaged together.

Figure 14:
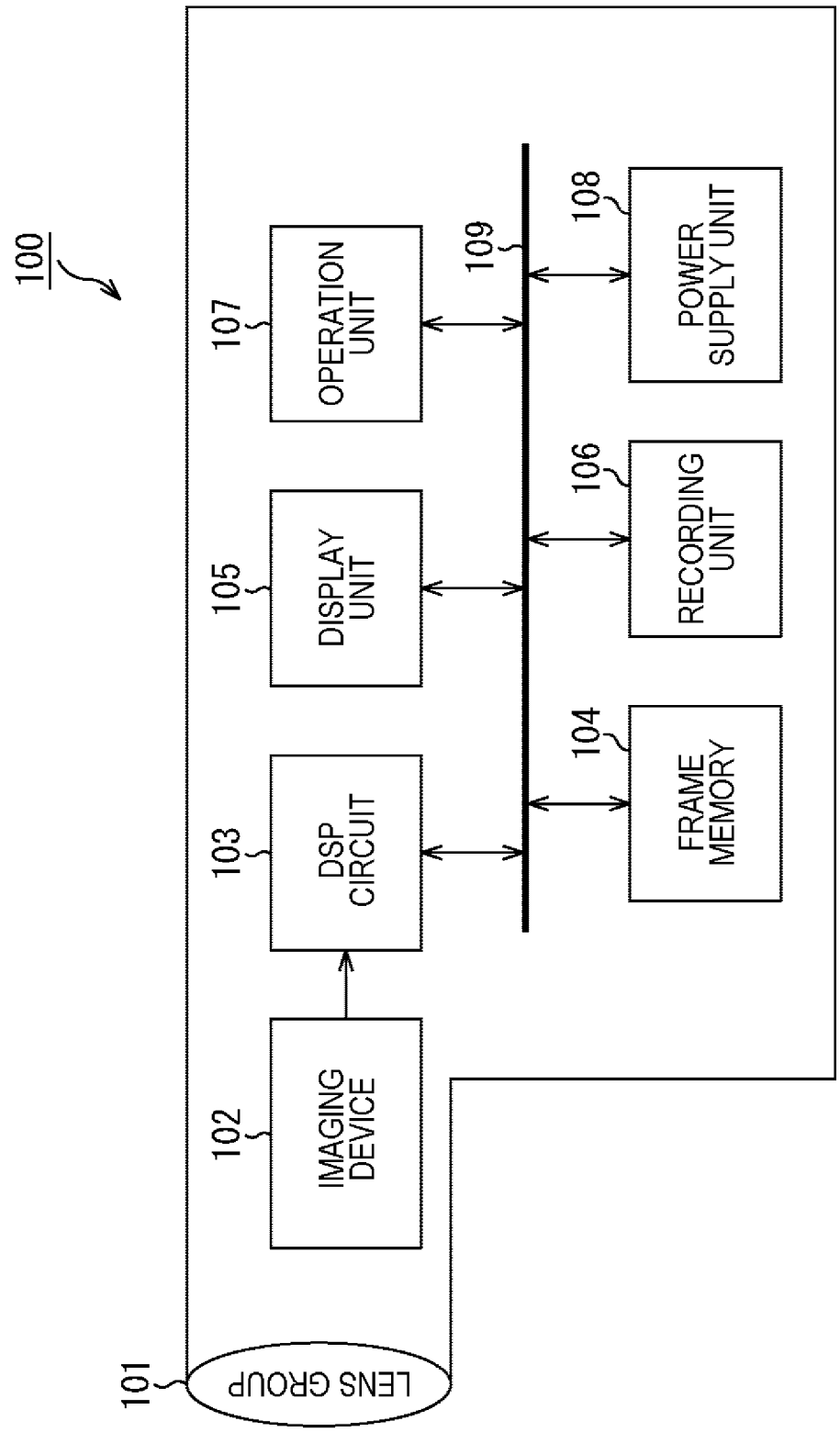
FIG. 14 is a block diagram showing a configuration example of an image pickup device as an electronic instrument to which the present technology is applied.

FIG. 14 is a block diagram showing a configuration example of an image pickup device as an electronic instrument to which the present technology is applied.

An image pickup device 100 of FIG. 14 includes an optical unit 101 including a lens group, an imaging device (imaging device) 102 adopting the configuration of the imaging device 1 of FIG. 1, and a digital signal processor (DSP) circuit 103 that is a camera signal processing circuit. Additionally, the image pickup device 100 also includes a frame memory 104, a display unit 105, a recording unit 106, an operation unit 107, and a power supply unit 108. The DSP circuit 103, the frame memory 104, the display unit 105, the recording unit 106, the operation unit 107, and the power supply unit 108 are mutually connected through a bus line 109.

The optical unit 101 captures incident light (image light) from a subject and forms an image on an imaging surface of the imaging device 102. The imaging device 102 converts the light quantity of incident light focused on the imaging surface by the optical unit 101 into an electrical signal in pixel units, and outputs the electrical signal as a pixel signal. As the imaging device 102, the imaging device 1 of FIG. 1, that is, an imaging device that outputs, together with one output image as additional information, predetermined image feature amount information calculated on the basis of multiple images obtained inside the device by high-speed readout can be used.

The display unit 105 is a thin display such as a liquid crystal display (LCD) and an organic electro luminescence (EL) display, for example, and displays a dynamic image or a still image picked up by the imaging device 102. The recording unit 106 records a dynamic image or a still image picked up by the imaging device 102 in a recording medium such as a hard disk and a semiconductor memory.

The operation unit 107 issues operation instructions for various functions of the image pickup device 100 according to the operation of the user. The power supply unit 108 appropriately supplies various power supplies serving as operation power supplies of the DSP circuit 103, the frame memory 104, the display unit 105, the recording unit 106, and the operation unit 107, to these supply targets.

As described above, by using the imaging device 1 with improved functions as the imaging device 102, the processing load on the DSP circuit 103 in the subsequent stage is reduced. Additionally, by using the image feature amount information added to the output image and output, the DSP circuit 103 can execute processing for enhancing the image quality or enhancing the functionality of the picked up image. Accordingly, also in the image pickup device 100 such as a video camera, a digital still camera, and a camera module for mobile devices like a cellular phone, it is possible to achieve high image quality or high functionality of a picked up image.

<8. Use Example of Image Sensor>

Figure 15:
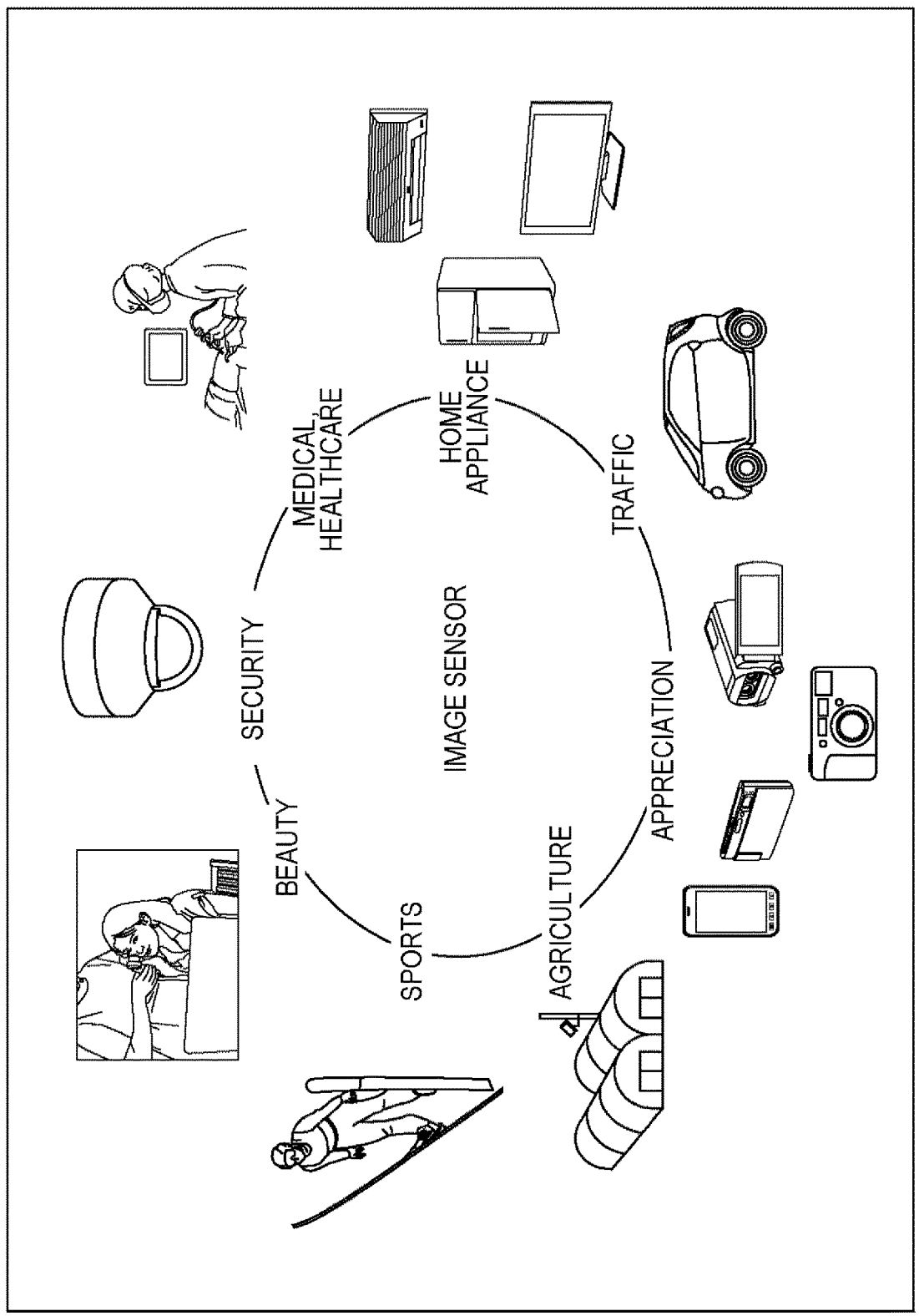
FIG. 15 is a diagram showing use examples of an image sensor.

FIG. 15 is a diagram showing use examples in which the above-described imaging device 1 is used as an image sensor.

The image sensor using the above-described imaging device 1 can be used in various cases of sensing light such as visible light, infrared light, ultraviolet light, and X-rays as described below, for example.

- A device for capturing an image to be provided for appreciation, such as a digital camera or a portable device with a camera function
- A device for traffic use, such as an on-vehicle sensor that captures an image of the front and back, the surroundings, the inside, or the like of a car for safe driving such as automatic stop or recognition of driver's condition, a monitoring camera that monitors traveling vehicles and roads, or a distance measurement sensor that measures the distance between vehicles
- A device provided to a home appliance, such as a TV, a refrigerator, or an air conditioner to capture an image of a user's gesture and perform device operation according to the gesture
- A device for medical and healthcare use, such as an endoscope or a device that performs blood vessel imaging by receiving infrared light
- A device for security use, such as a surveillance camera for crime prevention or a camera for person authentication
- A device for beauty use, such as a skin measuring instrument for capturing an image of the skin or a microscope for capturing an image of the scalp
- A device for sports use, such as an action camera or a wearable camera for sports application
- A device for agricultural use, such as a camera for monitoring the condition of fields and crops <9. Example of Application to Movable Body>

The technology of the present disclosure (present technology) can be applied to various products. For example, the technology of the present disclosure may be implemented as a device mounted on any type of movable bodies including a car, an electric car, a hybrid electric car, a motorcycle, a bicycle, personal mobility, an airplane, a drone, a ship, and a robot, for example.

Figure 16:
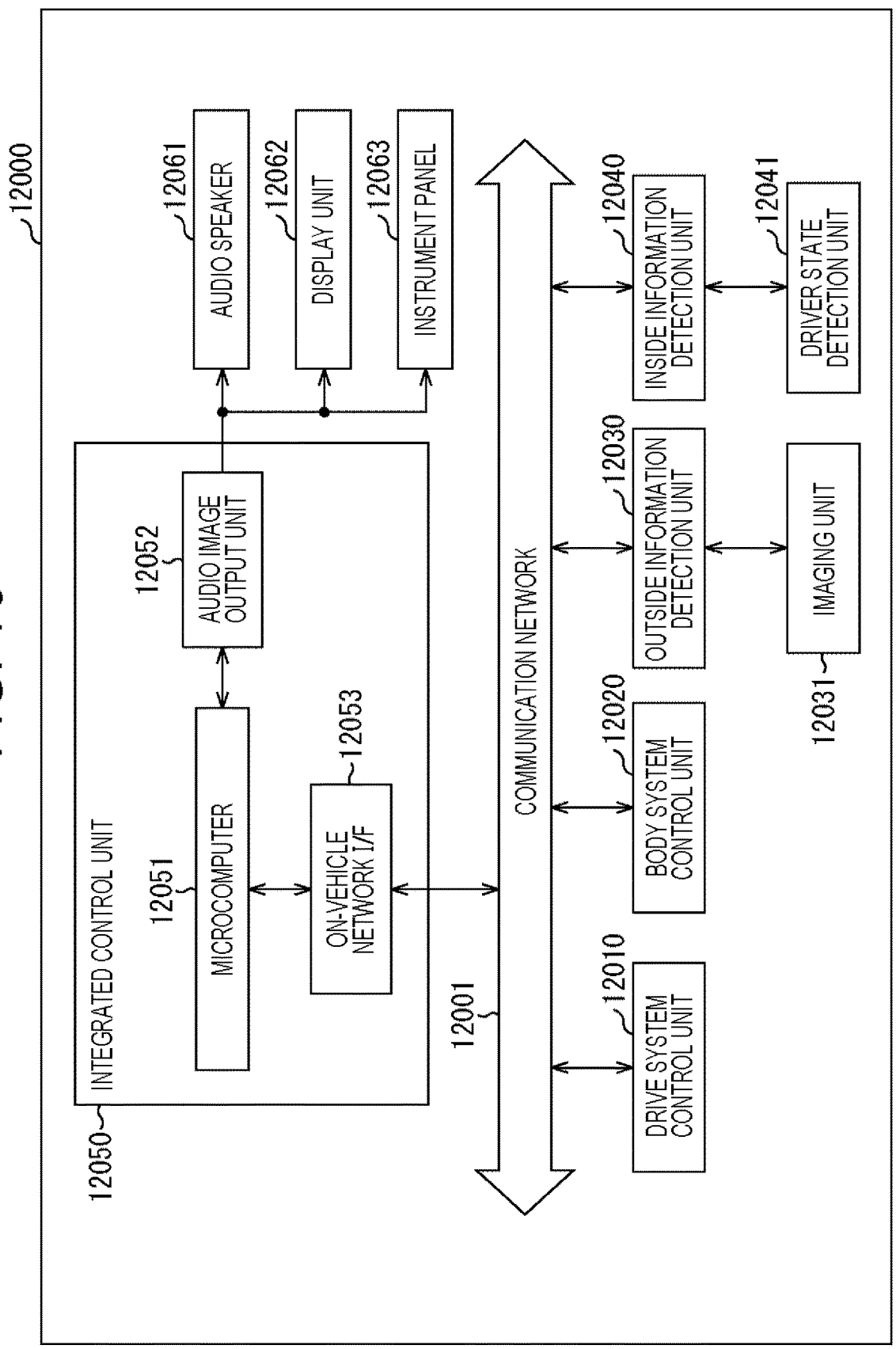
FIG. 16 is a block diagram showing an example of a schematic configuration of a vehicle control system.

FIG. 16 is a block diagram showing a schematic configuration example of a vehicle control system which is one example of a movable body control system to which the technology of the present disclosure can be applied.

A vehicle control system 12000 includes multiple electronic control units connected through a communication network 12001. In the example shown in FIG. 16, the vehicle control system 12000 includes a drive system control unit 12010, a body system control unit 12020, an outside information detection unit 12030, an inside information detection unit 12040, and an integrated control unit 12050. Additionally, as a functional configuration of the integrated control unit 12050, a microcomputer 12051, an audio image output unit 12052, and an on-vehicle network interface (I/F) 12053 are illustrated.

The drive system control unit 12010 controls the operation of devices related to a drive system of the vehicle according to various programs. For example, the drive system control unit 12010 functions as a control device of a drive force generation device for generating a drive force of a vehicle such as an internal combustion engine or a drive motor, a drive force transmission mechanism for transmitting the drive force to wheels, a steering mechanism that adjusts the steering angle of the vehicle, and a braking device that generates a braking force of the vehicle.

The body system control unit 12020 controls the operation of various devices equipped on the vehicle body according to various programs. For example, the body system control unit 12020 functions as a control device of a keyless entry system, a smart key system, a power window device, or of various lamps such as a head lamp, a back lamp, a brake lamp, a turn indicator, or a fog lamp. In this case, a radio wave transmitted from a portable device that substitutes for a key or a signal of various switches can be input to the body system control unit 12020. The body system control unit 12020 receives input of the radio wave or signals and controls the door lock device, the power window device, the lamp, or the like of the vehicle.

The outside information detection unit 12030 detects information outside the vehicle on which the vehicle control system 12000 is mounted. For example, an imaging unit 12031 is connected to the outside information detection unit 12030. The outside information detection unit 12030 causes the imaging unit 12031 to capture an image of the outside of the vehicle, and receives the captured image. The outside information detection unit 12030 may perform object detection processing or distance detection processing of a person, a vehicle, an obstacle, a sign, characters on a road surface, or the like on the basis of the received image.

The imaging unit 12031 is an optical sensor that receives light and outputs an electrical signal according to the amount of light received. The imaging unit 12031 can output an electric signal as an image, or can output the electric signal as ranging information. Further, the light received by the imaging unit 12031 may be visible light or non-visible light such as infrared light.

The inside information detection unit 12040 detects information regarding the inside of the vehicle. For example, a driver state detection unit 12041 that detects a state of a driver is connected to the inside information detection unit 12040. The driver state detection unit 12041 includes, for example, a camera for capturing an image of the driver, and the inside information detection unit 12040 may calculate the degree of fatigue or concentration of the driver or may determine whether the driver is asleep, on the basis of detection information input from the driver state detection unit 12041.

The microcomputer 12051 can calculate a control target value of the drive force generation device, the steering mechanism, or the braking device on the basis of information regarding the inside or outside of the vehicle acquired by the outside information detection unit 12030 or the inside information detection unit 12040, and output a control instruction to the drive system control unit 12010. For example, the microcomputer 12051 can perform coordinated control aimed to achieve the functions of an advanced driver assistance system (ADAS) including collision avoidance or shock mitigation of a vehicle, follow-up traveling based on the inter-vehicle distance, constant-speed traveling, vehicle collision warning, vehicle lane departure warning, or the like.

Additionally, the microcomputer 12051 can control the drive force generation device, the steering mechanism, the braking device, and the like on the basis of information regarding the periphery of the vehicle acquired by the outside information detection unit 12030 or the inside information detection unit 12040, and thereby perform coordinated control aimed for automatic driving, for example, of traveling autonomously without depending on the driver's operation.

Additionally, the microcomputer 12051 can output a control instruction to the body system control unit 12020 on the basis of information regarding the outside of the vehicle acquired by the outside information detection unit 12030. For example, the microcomputer 12051 can control the head lamp according to the position of a preceding vehicle or an oncoming vehicle detected by the outside information detection unit 12030 and perform coordinated control aimed to avoid glare, such as switching from high beam to low beam.

The audio image output unit 12052 transmits an output signal of at least one of audio or image to an output device capable of visually or aurally notifying a passenger or the outside of a vehicle of information. In the example of FIG. 16, an audio speaker 12061, a display unit 12062, and an instrument panel 12063 are illustrated as the output device. The display unit 12062 may include at least one of an onboard display and a head-up display, for example.

Figure 17:
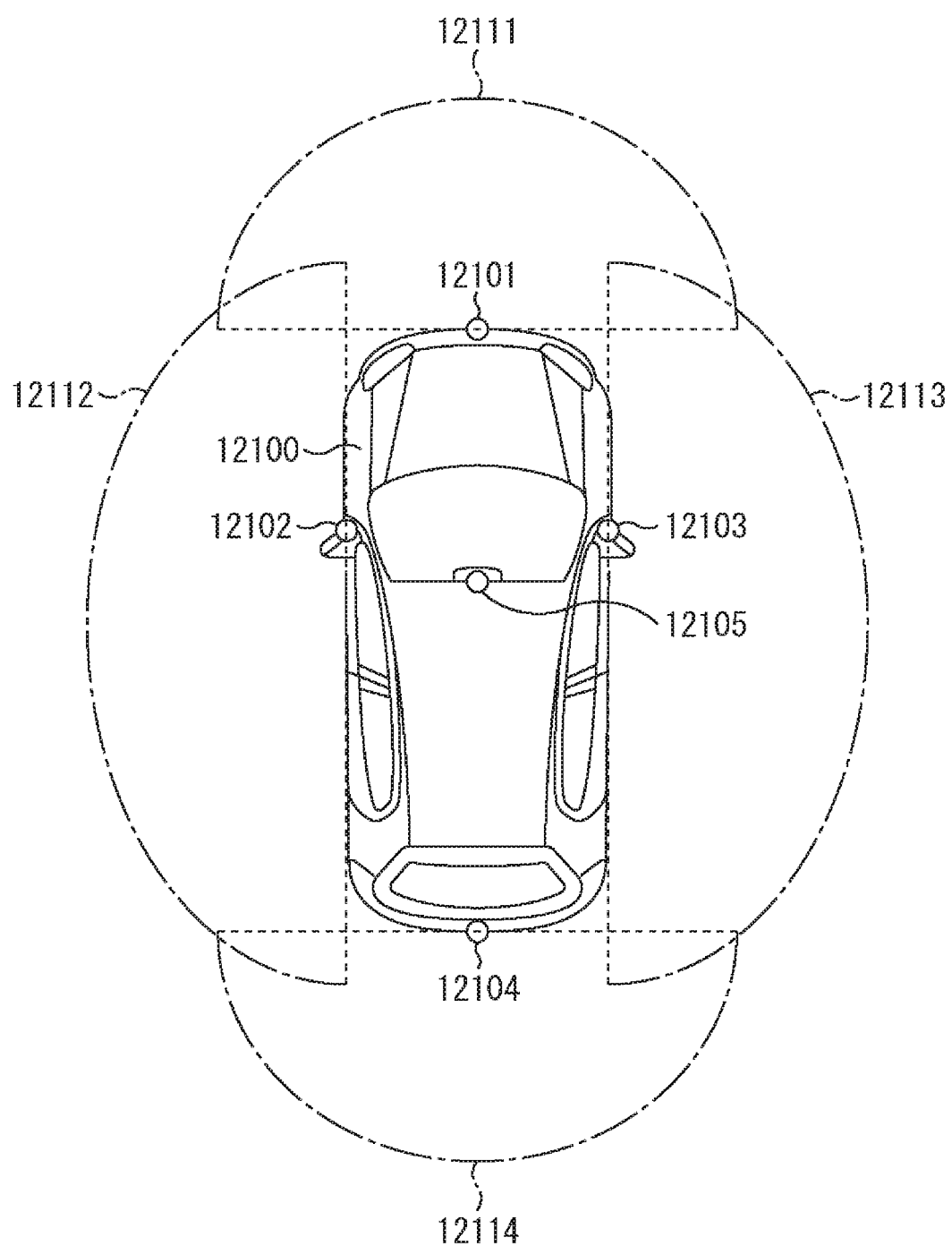
FIG. 17 is an explanatory diagram showing an example of installation positions of an outside information detection unit and an imaging unit.

FIG. 17 is a diagram showing an example of an installation position of the imaging unit 12031.

In FIG. 17, the vehicle 12100 has imaging units 12101, 12102, 12103, 12104, and 12105 as the imaging unit 12031.

For example, the imaging units 12101, 12102, 12103, 12104, and 12105 are provided in positions such as a front nose, a side mirror, a rear bumper, a back door, and an upper portion of a windshield in a vehicle compartment of the vehicle 12100. The imaging unit 12101 provided on the front nose and the imaging unit 12105 provided on the upper portion of the windshield in the vehicle compartment mainly acquire images of the front of the vehicle 12100. The imaging units 12102 and 12103 provided on the side mirrors mainly acquire images of the side of the vehicle 12100. The imaging unit 12104 provided on the rear bumper or the back door mainly acquires an image of the rear of the vehicle 12100. Images of the front acquired by the imaging units 12101 and 12105 are mainly used to detect a preceding vehicle or a pedestrian, an obstacle, a traffic light, a traffic sign, a lane, or the like.

Note that FIG. 17 shows one example of the imaging range of the imaging units 12101 to 12104. An imaging range 12111 indicates the imaging range of the imaging unit 12101 provided on the front nose, imaging ranges 12112 and 12113 indicate the imaging ranges of the imaging units 12102 and 12103 respectively provided on the side mirrors, and an imaging range 12114 indicates the imaging range of the imaging unit 12104 provided on the rear bumper or the back door. For example, by superimposing the pieces of image data captured by the imaging units 12101 to 12104 on one another, a bird's eye view of the vehicle 12100 viewed from above can be obtained.

At least one of the imaging units 12101 to 12104 may have a function of acquiring distance information. For example, at least one of the imaging units 12101 to 12104 may be a stereo camera including multiple imaging devices, or may be an imaging device having pixels for phase difference detection.

For example, the microcomputer 12051 can obtain the distance to each three-dimensional object in the imaging ranges 12111 to 12114 and the temporal change of this distance (relative velocity with respect to vehicle 12100) on the basis of distance information obtained from the imaging units 12101 to 12104, to extract, in particular, the closest three-dimensional object on the traveling path of the vehicle 12100 traveling at a predetermined speed (e.g., 0 km/h or more) in substantially the same direction as the vehicle 12100, as the preceding vehicle. Further, the microcomputer 12051 can set an inter-vehicle distance to be secured in advance before the preceding vehicle, and can perform automatic brake control (including follow-up stop control), automatic acceleration control (including follow-up start control), and the like. As described above, it is possible to perform coordinated control aimed for automatic driving, for example, of traveling autonomously without depending on the driver's operation.

For example, the microcomputer 12051 can extract while classifying three-dimensional object data related to three-dimensional objects into two-wheeled vehicles, ordinary vehicles, large vehicles, pedestrians, and other three-dimensional objects such as telephone poles on the basis of distance information obtained from the imaging units 12101 to 12104, and use the data for automatic avoidance of obstacles. For example, the microcomputer 12051 identifies obstacles around the vehicle 12100 as obstacles visible to the driver of the vehicle 12100 and obstacles difficult to see from the driver of the vehicle 12100. Then, the microcomputer 12051 determines the collision risk indicating the degree of risk of collision with each obstacle, and when the collision risk is a set value or more and there is a possibility of a collision, the microcomputer 12051 can perform driving support for avoiding collision by outputting a warning to the driver through the audio speaker 12061 or the display unit 12062, or performing forcible deceleration or steering for avoidance through the drive system control unit 12010.

At least one of the imaging units 12101 to 12104 may be an infrared camera that detects infrared light. For example, the microcomputer 12051 can recognize a pedestrian by determining whether or not a pedestrian is present in the images captured by the imaging units 12101 to 12104. Such pedestrian recognition is carried out by a procedure of extracting feature points in images captured by the imaging units 12101 to 12104 as an infrared camera, and a procedure of performing pattern matching processing on a series of feature points indicating the outline of an object to determine whether or not the object is a pedestrian, for example. If the microcomputer 12051 determines that a pedestrian is present in the captured images of the imaging units 12101 to 12104 and recognizes the pedestrian, the audio image output unit 12052 controls the display unit 12062 to superimpose and display a square outline for emphasis on the recognized pedestrian. Additionally, the audio image output unit 12052 may control the display unit 12062 to display an icon or the like indicating a pedestrian in a desired position.

Hereinabove, one example of the vehicle control system to which the technology of the present disclosure can be applied has been described. Of the above-described configuration, the technology of the present disclosure is applicable to the imaging unit 12031, for example. Specifically, the imaging device 1 of FIG. 1 can be applied to the imaging unit 12031. By applying the technology according to the present disclosure to the imaging unit 12031, information that cannot be detected from one image can be output as additional information by using multiple images obtained inside the imaging unit 12031. Hence, the processing load of the outside information detection unit 12030, the integrated control unit 12050, and the like can be reduced. Additionally, by using the image feature amount information added to the output image and output, the processing for enhancing the image quality or enhancing the function of the captured image can be executed by the outside information detection unit 12030 or the like. Hence, it is possible to reduce the driver's fatigue and burden by generating a more readily viewable captured image or improving the detection accuracy of an obstacle or the like.

Embodiments of the present technology are not limited to the above-described embodiments, and various modifications can be made without departing from the scope of the present technology.

For example, a form combining some of the functions of the embodiments described above can be adopted.

In the specification, steps described in the flowcharts may be performed chronologically according to the described order, as a matter of course, but does not necessarily have to be processed in chronological order, and may be performed in parallel or at a necessary timing such as when a call is made.

Note that the effects described in the specification are merely examples and are not limited, and effects other than those described in the specification can be obtained.

Note that the present technology can also have the following configurations.

(1)

An imaging device including a pixel array unit in which pixels are arranged in a matrix, and a control unit that controls image readout by the pixel array unit, in which the control unit causes the pixel array unit to perform image readout twice or more within a cycle of outputting one image to the outside.

(2)

The imaging device according to (1), in which the control unit performs control to switch between a first operation mode of causing the pixel array unit to perform image readout twice or more within a cycle of outputting one image to the outside, and a second operation mode of causing the pixel array unit to perform the image readout once within the cycle of outputting one image to the outside.

(3)

The imaging device according to (1) or (2) further including an image feature detection unit that detects a predetermined feature amount of the image, and a signal processing unit that performs predetermined signal processing on the image, in which feature amount information indicating the feature amount is added to an output image after signal processing, and output to the outside.

(4)

The imaging device according to (3), in which the image feature detection unit uses multiple images read out within the cycle to detect, as the feature amount, flicker information for correcting a flicker component included in an image.

(5)

The imaging device according to (3) or (4), in which the signal processing unit uses multiple images read out within the cycle to detect a periodicity of noise in a time direction, and performs 3D-NR processing for reducing noise.

(6)

The imaging device according to (3) or (4), in which the signal processing unit uses multiple images read out within the cycle to perform processing for generating an HDR image.

(7)

A method of driving an imaging device in which an imaging device including a pixel array unit in which pixels are arranged in a matrix and a control unit that controls image readout by the pixel array unit causes the pixel array unit to perform image readout twice or more within a cycle of outputting one image.

(8)

An electronic instrument including an imaging device having a pixel array unit in which pixels are arranged in a matrix, and a control unit that controls image readout by the pixel array unit, in which the control unit causes the pixel array unit to perform image readout twice or more within a cycle of outputting one image to the outside.

REFERENCE SIGNS LIST

1 Imaging device
20 Pixel
21 Pixel array unit
23 Frame memory
24 Image feature detection unit
25 Signal processing unit
26 Control unit
100 Image pickup device
102 Imaging device

The invention claimed is:

1. An imaging device, comprising:
a pixel array that includes a plurality of pixels in a matrix; and
circuitry configured to:
control switch between a first operation mode and a second operation mode based on power consumption of the imaging device, wherein
the pixel array is configured to:
execute in the first operation mode, an image readout operation a plurality of times to read a plurality of images within a cycle; and
execute, in the second operation mode, the image readout operation once within the cycle, and
the cycle corresponds to output of one image to an outside of the imaging device;
generate flicker information for each image of the plurality of images read within the cycle;
generate an output image based on the plurality of images;
add the generated flicker information of the plurality of images to the output image to obtain an image signal; and
output the image signal.

2. The imaging device according to claim 1, wherein the circuitry is further configured to:
detect a feature amount of each image of the plurality of images, wherein the feature amount is different from the flicker information;
execute a signal processing operation on each image of the plurality of images;
add feature amount information that indicates the feature amount to the output image, wherein the output image is a result of the execution of the signal processing operation on each image of the plurality of images; and
output the output image with the added feature amount information.

3. The imaging device according to claim 2, wherein the flicker information corresponds to correction of a flicker component in the output image.

4. The imaging device according to claim 2, wherein the circuitry is further configured to:
detect a periodicity of noise in a time direction; and
execute a three-dimensional Noise Reduction (3D-NR) processing operation that corresponds to reduction of the noise, and
the periodicity of the noise is detected based on the read plurality of images.

5. The imaging device according to claim 2, wherein the circuitry is further configured to execute a specific processing operation associated with generation of a High Dynamic Range (HDR) image, and
the specific processing operation is executed based on the read plurality of images.

6. The imaging device according to claim 1, wherein the circuitry is further configured to correct flicker in the output image based on the flicker information of the plurality of images.

7. A method, comprising:
in an imaging device including a pixel array that includes a plurality of pixels in a matrix, comprising:
controlling switch between a first operation mode and a second operation mode based on power consumption of the imaging device;
executing, in the first operation mode, an image readout operation a plurality of times to read a plurality of images within a cycle of outputting one image to an outside of the imaging device;
executing, in the second operation mode, the image readout operation once within the cycle;
generating flicker information for each image of the plurality of images read within the cycle;
generating an output image based on the plurality of images;
adding the generated flicker information of the plurality of images to the output image to obtain an image signal; and
outputting the image signal.

8. An electronic instrument, comprising:
an imaging device that includes:
a pixel array that includes a plurality of pixels in a matrix; and
circuitry configured to:
control switch between a first operation mode and a second operation mode based on power consumption of the imaging device, wherein
the pixel array is configured to:
execute in the first operation mode, an image readout operation a plurality of times to read a plurality of images within a cycle; and
execute, in the second operation mode, the image readout operation once within the cycle, and
the cycle corresponds to output of one image to an outside of the imaging device;
generate flicker information for each image of the plurality of images read within the cycle;
generate an output image based on the plurality of images;

add the generated flicker information of the plurality of images to the output image to obtain an image signal; and
output the image signal.

* * * * *